United States Patent
Manestar

[19]

[11] Patent Number: 5,992,247
[45] Date of Patent: Nov. 30, 1999

[54] APPARATUS FOR INSPECTING LATERAL SEWER PIPES

[75] Inventor: Edward Manestar, Waukesha, Wis.

[73] Assignee: Aries Industries Incorporated, Sussex, Wis.

[21] Appl. No.: 09/064,920

[22] Filed: Apr. 23, 1998

[51] Int. Cl.⁶ .................................................. G01M 19/00
[52] U.S. Cl. ............................................................ 73/865.8
[58] Field of Search ................................. 73/865.8, 623; 324/220; 376/245, 249; 348/82, 84

[56] References Cited

U.S. PATENT DOCUMENTS

| | | | |
|---|---|---|---|
| Re. 33,160 | 2/1990 | Guthrie et al. | 73/40.5 R |
| 2,909,975 | 10/1959 | Ulrich | 95/11 |
| 2,971,259 | 2/1961 | Hahnau et al. | 33/1 |
| 3,400,574 | 9/1968 | Cramer | 73/40.5 |
| 3,750,711 | 8/1973 | Conklin et al. | 138/97 |
| 3,885,091 | 5/1975 | Fish et al. | 178/6 |
| 3,958,607 | 5/1976 | Gray | 138/97 |
| 4,107,738 | 8/1978 | Van Norman | 358/100 |
| 4,246,604 | 1/1981 | Hundertmark et al. | 358/100 |
| 4,286,287 | 8/1981 | Williams | 358/100 |
| 4,432,931 | 2/1984 | Lockett | 376/248 |
| 4,442,891 | 4/1984 | Wood | 166/55.2 |
| 4,484,602 | 11/1984 | Guthrie | 138/93 |
| 4,577,388 | 3/1987 | Martin et al. | 29/558 |
| 4,651,558 | 3/1987 | Martin et al. | 73/40.5 R |
| 4,677,472 | 6/1987 | Wood | 358/100 |
| 4,701,988 | 10/1987 | Wood | 29/33 T |
| 4,770,105 | 9/1988 | Takagi et al. | 73/866.5 |
| 4,991,006 | 2/1991 | Wood | 358/100 |
| 5,318,395 | 6/1994 | Driver | 409/132 |
| 5,374,174 | 12/1994 | Long, Jr. | 425/11 |
| 5,423,230 | 6/1995 | Olander et al. | 73/865.8 |
| 5,571,977 | 11/1996 | Kipp | 73/865.8 |

*Primary Examiner*—Robert Raevis
*Attorney, Agent, or Firm*—Michael Best & Friedrich LLP

[57] ABSTRACT

A self-propelled lateral inspection apparatus includes a propulsion motor that drives friction members to propel the apparatus along an inside surface of a main sewer pipe. The apparatus also includes a main camera and a lateral camera. The main camera is used to view the relative positions of the lateral camera and an opening to a lateral sewer pipe to be inspected. The lateral camera is interconnected to a push rod cable having a flexible core and lateral camera wiring encased in a resilient shell. A rotate motor and a tilt motor act on a launch chute assembly to properly align the lateral inspection camera with the lateral sewer pipe opening. A drive assembly, including a drive motor, at least one drive gear, and at least one pressure roller, inserts and retracts the push rod cable and lateral camera into and from the lateral sewer pipe.

17 Claims, 8 Drawing Sheets

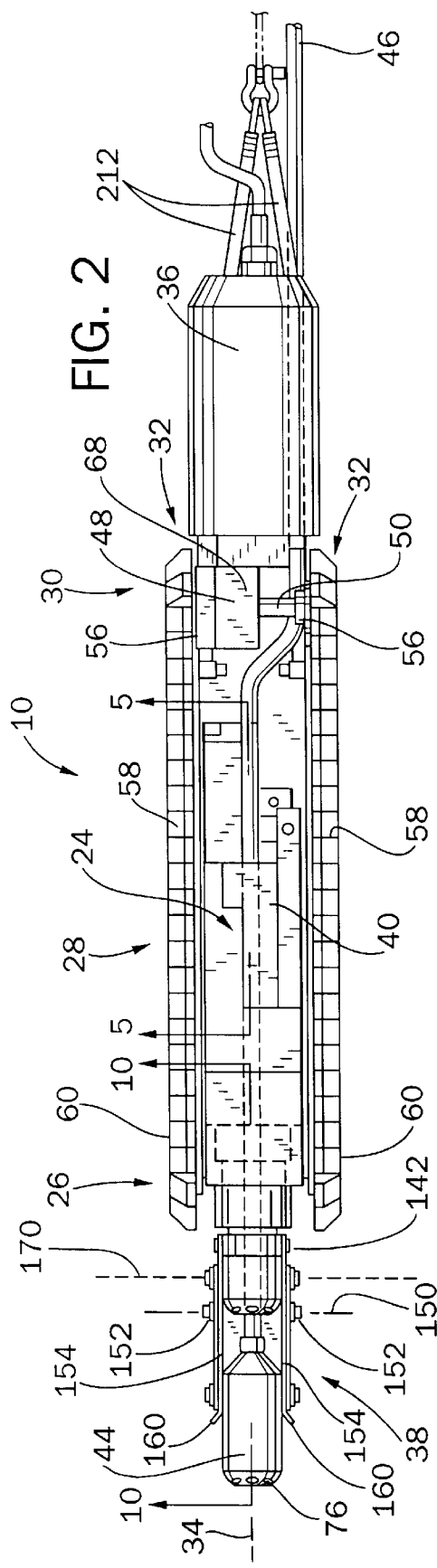
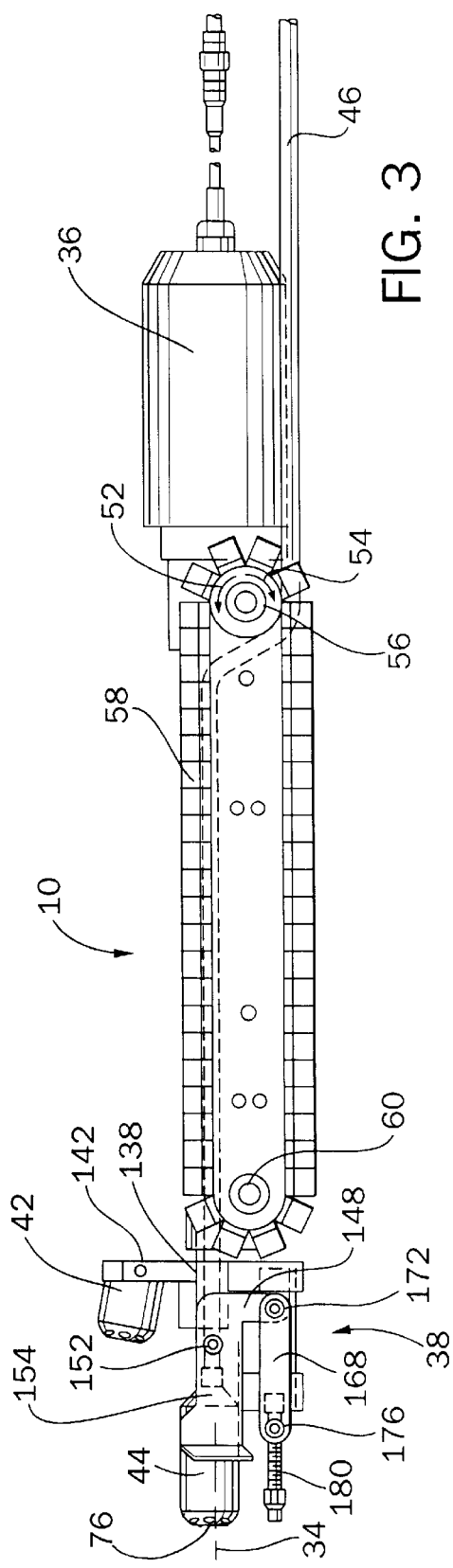

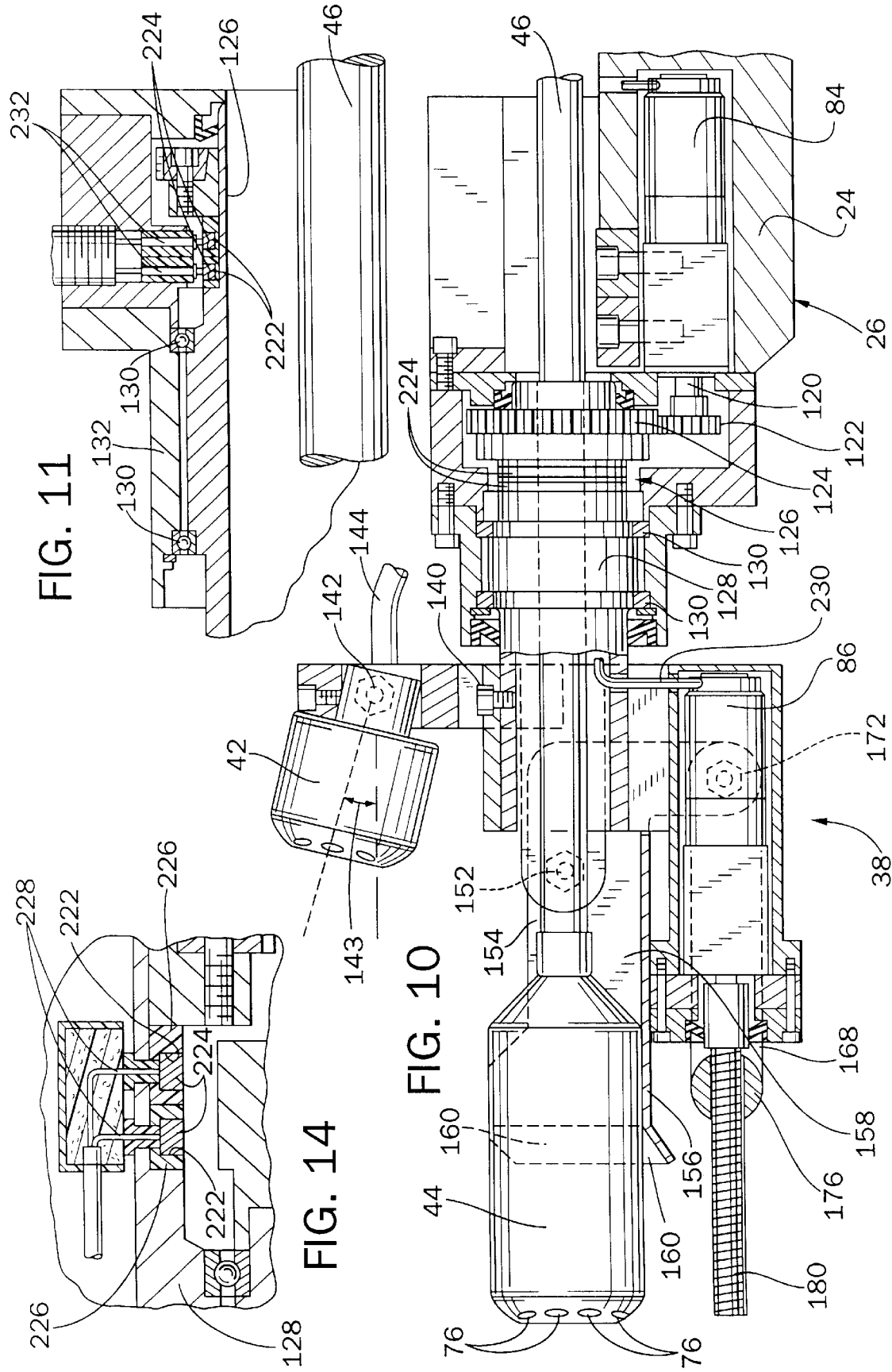

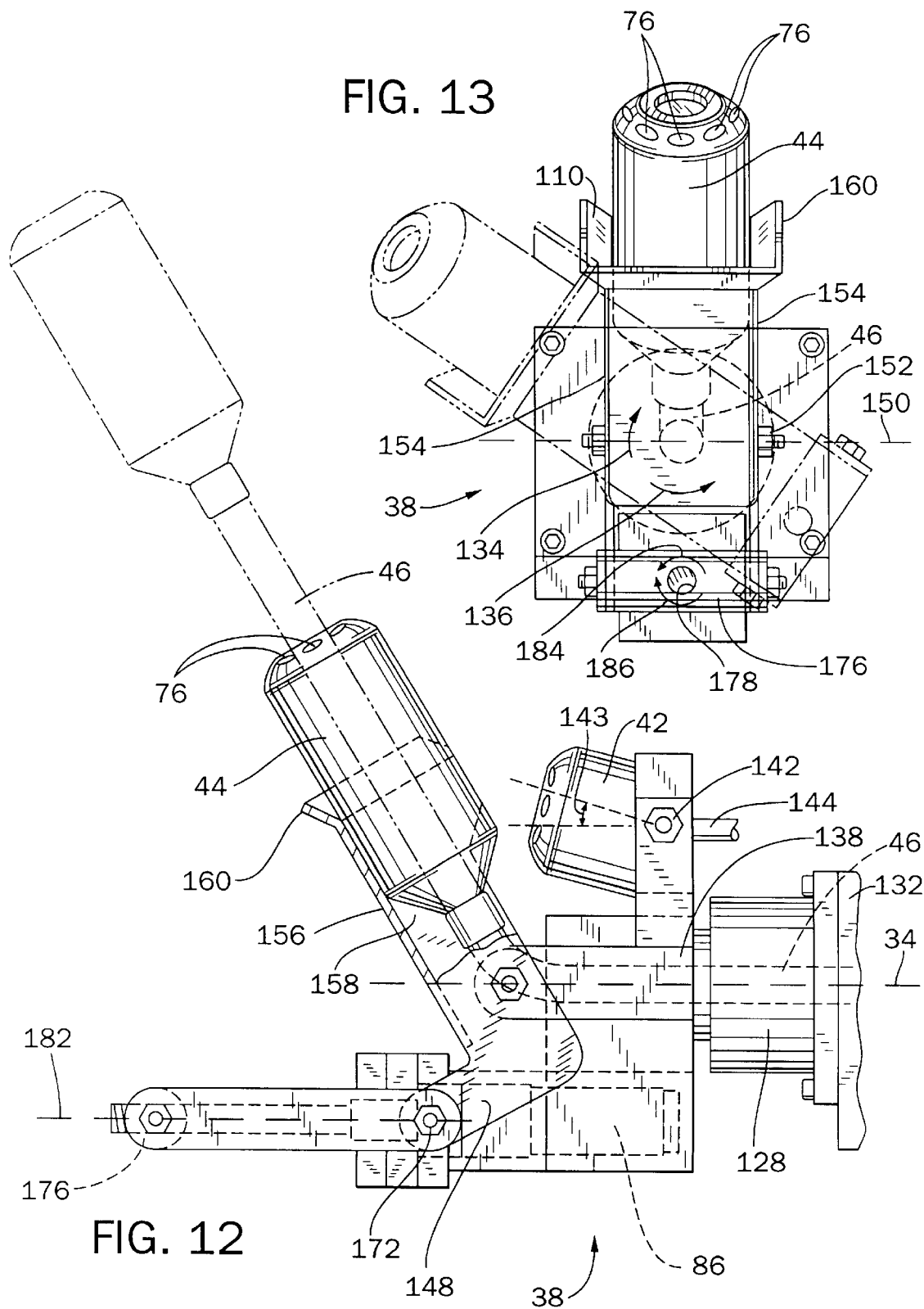

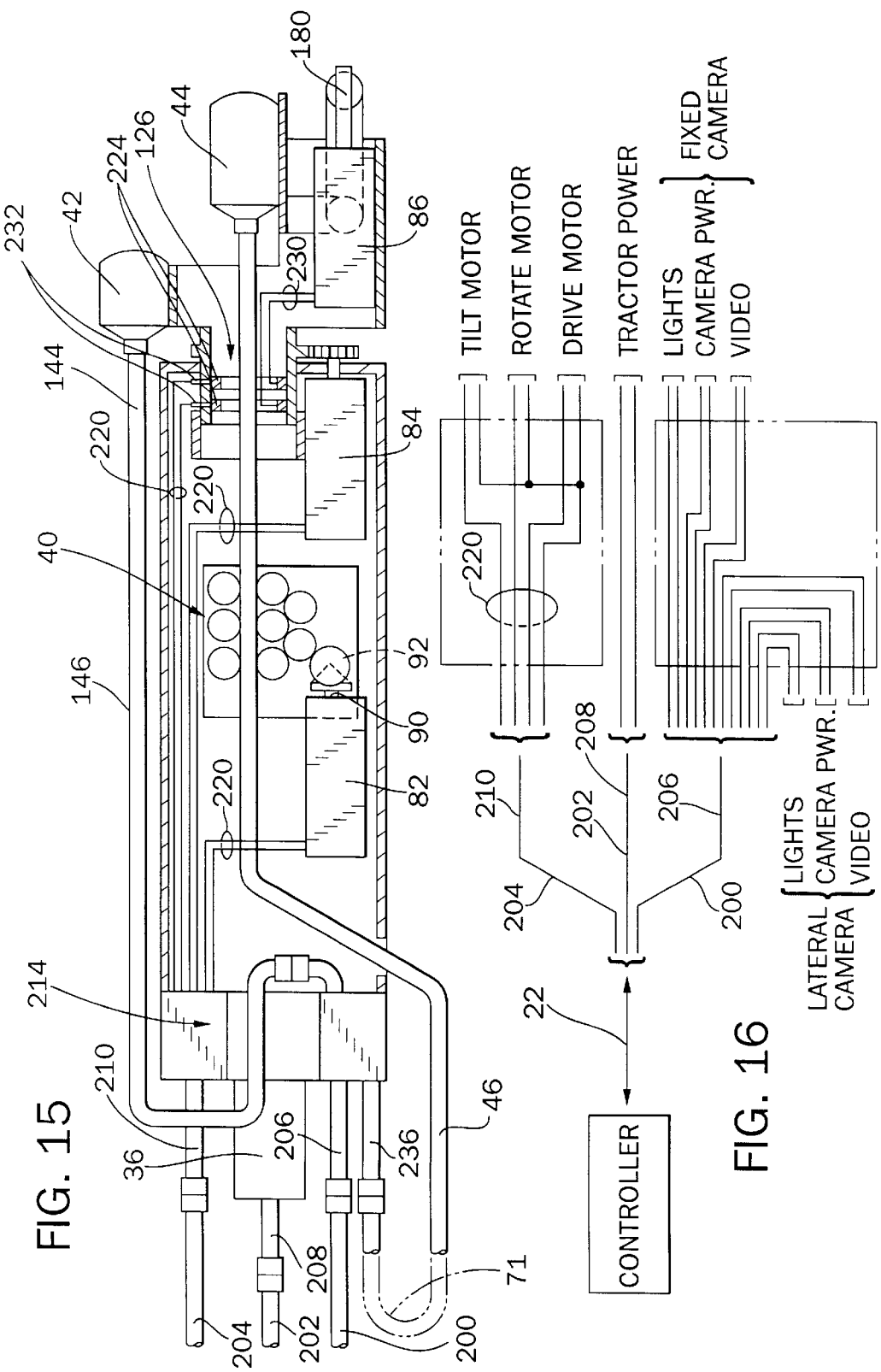

APPARATUS FOR INSPECTING LATERAL SEWER PIPES

BACKGROUND

The invention relates generally to sewer interior video inspection devices and more particularly to devices for inspecting lateral sewer pipes.

A prior art lateral inspection device is disclosed in U.S. Pat. No. 4,651,558. The lateral inspection device disclosed in that patent includes a cylindrical body housing a lateral camera, and a sled having a main camera mounted thereon. The device is towed through a sewer main with tow cables attached to winches at the upstream and downstream manholes. An above-ground operator views the relative positions, of the lateral camera and an opening to a lateral sewer pipe at an extended distance through the main camera. When the lateral camera is close to the lateral sewer pipe opening, the cylindrical body is rotated to properly align the lateral camera with the opening to the lateral sewer pipe, and the lateral camera is pushed into the lateral sewer pipe with a hollow flexible push rod. All the necessary electrical transmission wiring and video and light power wiring for the lateral inspection camera is housed within the hollow center of the push rod.

SUMMARY

Several problems with prior art lateral inspection devices, and particularly the one disclosed in U.S. Pat. No. 4,651,558, have been discovered.

First, the prior art lateral inspection device is moved through the main sewer pipe by winches located at an upstream manhole and a downstream manhole. It is very difficult and time consuming to accurately position a lateral inspection device with such a two-winch system because of the long tow lines, the sewage flow in the main pipe, the extended tangential view of the lateral opening provided by the main camera, and the difficulty in coordinating two remotely positioned winches.

Second, the prior art main camera is mounted on a sled that is separate from the cylindrical body, and that is towed upstream of the cylindrical body. The main camera therefore faces backward with respect to the forward, upstream motion of the device through the main pipe. The prior art main camera does not transmit images of the lateral pipe opening until the main camera has already moved past the lateral pipe opening. Depending on the speed at which the device is towed through the main pipe, this may result in a short reaction time between the moment the lateral pipe opening is first seen, and the moment that a side camera opening in the cylindrical body aligns with the lateral pipe opening. Should the side camera opening of the device move past the lateral pipe opening, the device must be stopped and pulled backward downstream. As mentioned above, such fine adjustment is difficult with the prior art two-winch system.

A third drawback of the prior art device is that the device's cylindrical body substantially fills a typical main pipe through which the device is being towed. This partially obstructs the main camera's view of the relative positions of the lateral pipe opening and the side camera opening. Additionally, because the main camera is towed in front of the cylindrical body at an extended distance, the view of the lateral pipe opening is either non-existent or oblique. The prior art positioning of the main camera therefore creates a highly distorted view, making verification of actual insertion difficult or impossible. It is difficult to accurately align the side camera opening and the lateral sewer pipe opening under those conditions, and such alignment may involve some guesswork. In most cases, numerous attempts must be made before the prior art lateral camera is successfully inserted into the lateral sewer pipe opening.

The configuration of the prior art device makes viewing the insertion of the lateral cable into the lateral sewer pipe difficult or impossible. Therefore, the prior art device does not enable an operator to monitor the push cable's progress as the cable is inserted into the lateral sewer pipe. Lateral cameras are frequently submerged in sludge within the lateral sewer pipe, in which case the lateral camera view is temporarily interrupted. In the prior art device, the extended distance between the main camera and the lateral sewer pipe opening, and the oblique angle at which the main camera views the lateral sewer pipe opening, prevent the main camera from monitoring the lateral camera's progress in such a situation.

Another drawback discovered in the prior art device is that the side opening of the cylindrical body is essentially a curved chute that has a fixed orientation with respect to the cylindrical body. Consequently, the prior art device deploys the lateral camera through the side opening at a fixed, pre-set angle with respect to the cylindrical body. In some instances, the pre-set angle may not be the ideal angle for deploying the lateral camera into the lateral sewer pipe, or the prior art lateral camera may not be insertable at all at the pre-set angle.

Therefore, a need exists for a lateral inspection apparatus that is easily propelled along and controlled within the inside of a main sewer pipe, that accurately views the relative positions of a lateral pipe opening and a lateral inspection camera, and that allows accurate alignment of the lateral inspection camera and the lateral pipe opening.

The present invention provides an apparatus for inspecting lateral sewer pipes from a main sewer pipe. The main sewer pipe conducts a flow of sewage therethrough in a downstream direction, with an upstream direction being generally opposite the downstream direction.

The apparatus includes a propulsion motor for propelling the device along the inside of the main sewer pipe. The propulsion motor drives tractor treads or other friction members that interact with an inner surface of a main sewer pipe wall. The propulsion motor is operable in a forward gear setting in which the motor propels the apparatus in the upstream direction through forward rotation of the tractor treads. The propulsion motor is also operable in a reverse gear setting in which the motor propels the apparatus in the downstream direction through reverse rotation of the tractor treads. The propulsion motor also has a neutral setting in which the motor does not rotate the tractor treads, and allows the tractor treads to rotate in either the forward or reverse direction so that the apparatus can be dragged from the main sewer pipe if necessary. The apparatus is therefore self-propelled and removes the need for a two-winch system.

A main camera is interconnected with a launch chute assembly on a front end of the apparatus, allowing an operator in a remote control station to view upcoming lateral pipe openings. A lateral inspection camera is supported by a chute member of the launch chute assembly in a retracted position at the front of the apparatus. The operator is able to view the relative positions of the lateral inspection camera and the lateral pipe opening with the main camera. Because the main camera and the lateral camera are positioned adjacent to one another on the front end of the apparatus, the main camera's view of the lateral camera and the lateral pipe opening are unobstructed by the apparatus during insertion. Also, the main camera of the present invention views the opening to the lateral sewer pipe at a favorable angle for accurate positioning and insertion of the lateral camera.

When the apparatus has advance the proper distance along the main pipe to position the lateral camera near the lateral pipe opening, the propulsion motor is turned off and left in forward gear. When left in forward gear, the motor will resist reverse rotation of the tractor treads. A rotate motor rotates the launch chute assembly about a longitudinal axis of the apparatus, rotating the main camera with the launch chute assembly. A tilt motor tilts the chute member and the lateral inspection camera about a transverse axis that is substantially normal to the longitudinal axis.

This tilting and rotating motion allows precise alignment of the lateral camera and the lateral pipe opening. The rotate and tilt motors together allow fractional inch movement of the launch chute assembly and the lateral camera in forward, reverse, and angular directions.

Because the main camera and the lateral camera are both supported on the launch chute assembly, and the main camera is rotated about the longitudinal axis with the launch chute assembly, the lateral camera remains positioned in front of the main camera while the lateral camera is in the fully retracted position. The apparatus of the present invention therefore better facilitates alignment of the lateral pipe opening and the lateral camera than prior art lateral inspection devices.

The lateral inspection camera is connected to a push rod cable comprising a flexible fiberglass rod core with all necessary transmission wiring for the lateral camera disposed along an outer surface of the fiberglass rod. A resilient shell encases the transmission wiring and the fiberglass rod, and defines a resilient outer surface of the push rod cable.

A drive system for inserting and retracting the push rod cable with respect to the lateral sewer pipe comprises a drive motor operably interconnected to at least one drive gear having drive gear teeth. At least one pressure roller presses the push rod cable against the at least one drive gear causing the drive gear teeth to impinge on the resilient casing. The drive motor is capable of rotating the at least one drive gear in either an insertion direction or a retraction direction which causes respective insertion and retraction of the push rod cable with respect to the lateral sewer pipe. The drive motor is a gear motor that locks the at least one drive gear when the drive motor is turned off.

Routinely the lateral inspection camera encounters an obstruction in the lateral sewer pipe, and the drive motor is unable to push the lateral camera past the obstruction. In this case, the drive motor may be turned off, thereby locking the at least one drive gear. Then the propulsion motor may be engaged to move the apparatus in the forward direction and reverse direction in rapid succession, thereby ramming the lateral inspection camera against the obstruction. The propulsion motor is more powerful that the drive motor, and therefore is able to overcome many obstacles that cannot be overcome by the drive motor.

The lateral camera is further assisted and caused to roll or twist by rotating and tilting the launch chute assembly. Therefore, the rotate and tilt motors are also used to overcome obstacles encountered within the lateral sewer pipe.

Prior art devices using a two-winch system are unable to properly coordinate this rapid forward and reverse motion because of the difficulty of coordinating the winches and closely controlling the amount of forward and reverse motion.

BRIEF DESCRIPTION OF THE DRAWINGS

FIG. 2 is a top plan view of the apparatus.

FIG. 3 is a side elevational view of the apparatus.

FIG. 10 is a partial side cross sectional view of a portion of the apparatus taken generally along line 10—10 in FIG. 2.

FIG. 11 is an enlarged cross sectional view of a portion of the apparatus.

FIG. 12 is an enlarged side elevational view of the launch chute assembly of the apparatus.

FIG. 13 is an enlarged front elevational view of the launch chute assembly of the apparatus.

FIG. 14 is an enlarged cross sectional view of a portion of the apparatus.

FIG. 15 is a schematic drawing of the electrical and video wiring of the apparatus.

FIG. 16 is a schematic drawing of the electrical and video wiring of the apparatus.

DETAILED DESCRIPTION

Figure 1:
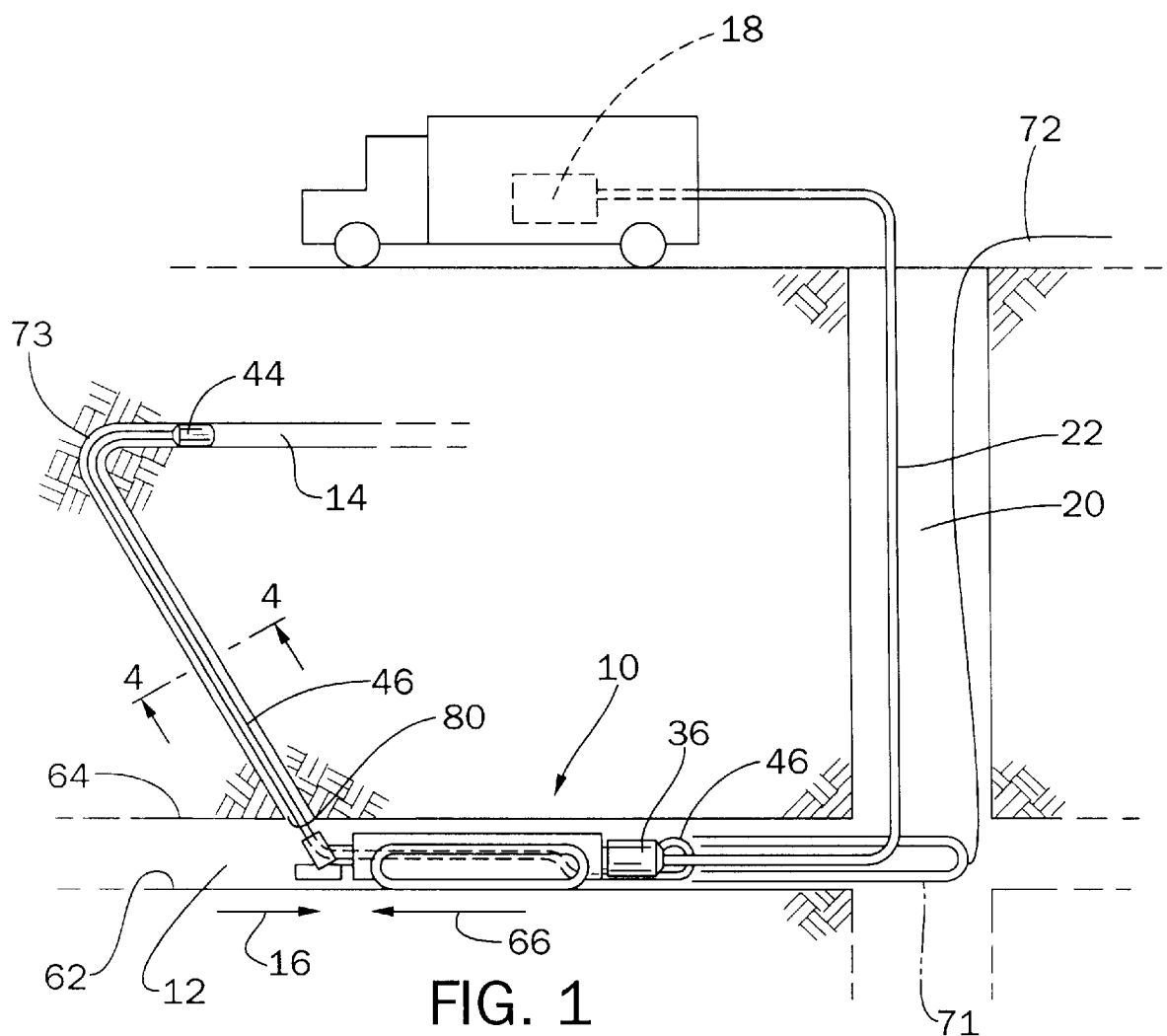
FIG. 1 is a side elevational view of the lateral inspection apparatus of the present invention disposed in a main sewer pipe and having the lateral inspection camera inserted into a lateral sewer pipe.

FIG. 1 illustrates a lateral inspection apparatus 10 being used in an intended environment including a main sewer pipe 12 and a lateral sewer pipe 14. The preferred apparatus is sized for use in main sewer pipes having a diameter as small as six inches, and a lateral sewer pipe having a diameter as small as three inches. Sewage flows from the lateral sewer pipe 14 and through the main sewer pipe 12 in a downstream direction 16. A remote control station 18 is located in a mobile vehicle, and includes all controls necessary to use the lateral inspection apparatus 10. The remote control station 18 can also be provided in compact form that can be carried by an operator. The mobile remote control station 18 allows the lateral inspection apparatus 10 to be relatively easily set up and used at one segment of main sewer pipe 12, and then moved to another segment and again easily set up and used.

The lateral inspection apparatus 10, which in the preferred embodiment is a tractor, is inserted into the main pipe 12 through a manhole or sewer access conduit 20 downstream of the lateral sewer pipe 14 to be inspected. A supply cable 22 interconnects the remote control station 18 with the tractor 10. As described below, the supply cable 22 includes all the power and video wiring for the various motors, cameras, and lights of the tractor 10.

Referring to FIGS. 2 and 3, the tractor 10 includes a frame 24 having a front portion 26, a middle portion 28, a rear portion 30, sides 32, and a longitudinal axis 34. A propulsion motor or tractor motor 36 is interconnected with the rear portion 30 of the frame 24. A launch assembly includes a launch chute assembly 38 interconnected with the front portion 26 of the frame 24, and a drive assembly 40 (see FIG. 5) interconnected with the middle portion 28 of the frame 24. A main camera 42 is interconnected with the launch chute assembly 38, and a lateral camera 44 is supported by the launch chute assembly 38 as described below. A push rod cable 46 interconnects the tractor 10 with the lateral camera 44.

As seen in FIG. 2, the tractor motor 36 includes a power transmission 48 and a drive shaft 50. A suitable tractor motor is a ⅓ hp motor provided by Minnesota Electric Technologies (MET) of Mankato, Minn. The drive shaft 50 rotates in either a forward direction 52 or a reverse direction 54 (see FIG. 3), and drives a pair of drive sprockets or tractor drive wheels 56 rotatably mounted on the rear portion 30 of the frame 24. Tractor treads or other friction members 58 are interconnected with, and driven by, the tractor drive wheels 56 and extend along the sides 32 of the frame 24. A pair of driven tractor wheels or sprockets 60 are rotatably interconnected with the front portion 26 of the frame 24 to facilitate operation of the tractor treads 58.

The friction members 58 may be any means for propelling the apparatus 10 along the inside of the main pipe 12. For example, the friction members 58 may be suction cups, wheels, legs, rollers, claws, belts, or any other movable member that frictionally interacts with an inner surface 62 of a main pipe wall 64 (see FIGS. 1 and 9).

Figure 9:
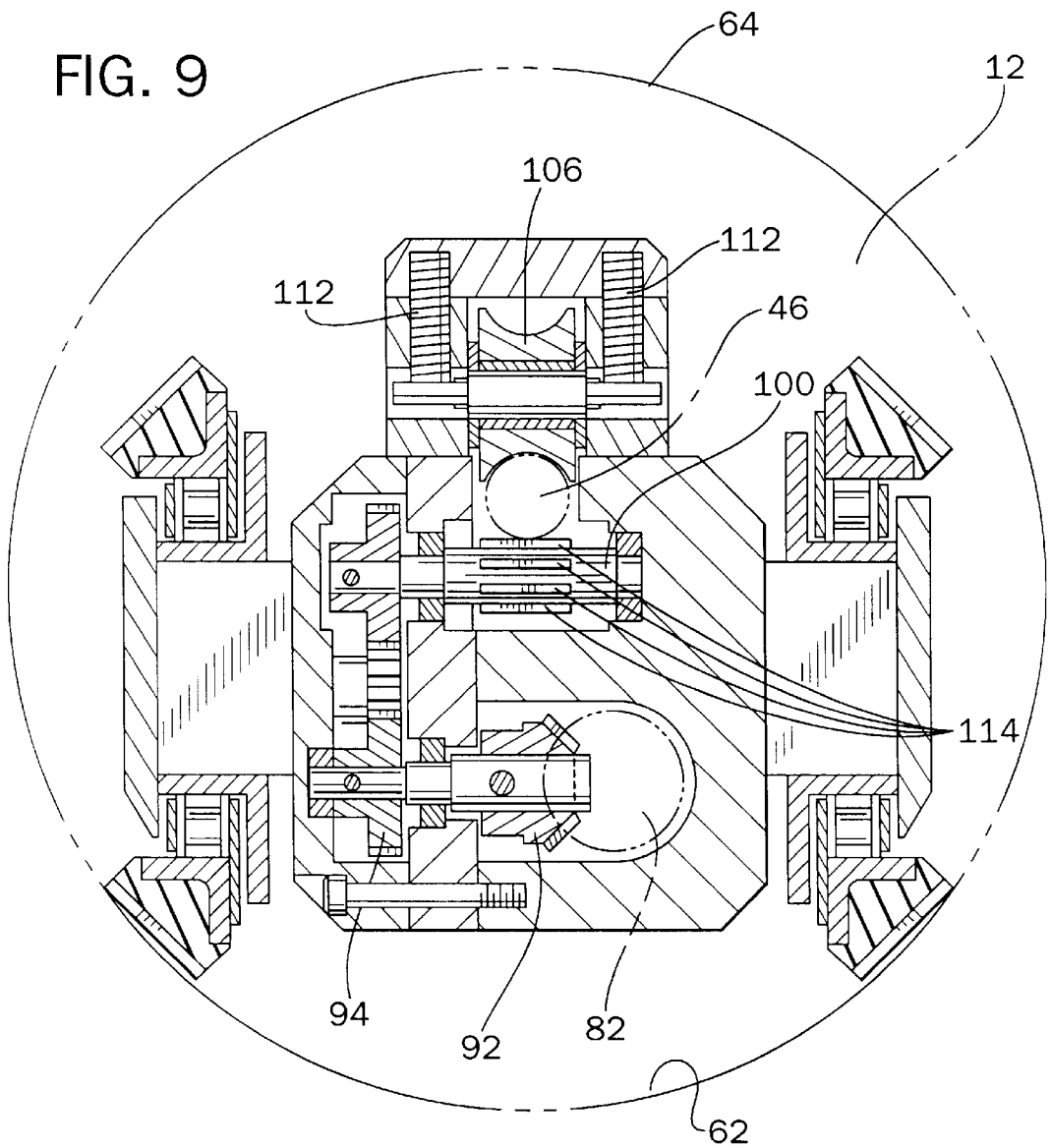
FIG. 9 is a cross sectional view of a portion of the apparatus taken generally along line 9—9 in FIG. 5.

Referring to FIGS. 1 and 9, the tractor treads 58 interact with the inner surface 62 of the main sewer pipe wall 64. The propulsion motor 36 is operable in a forward gear setting in which the motor 36 rotates the drive shaft 50 and tractor treads 58 in the forward direction 52. Forward rotation of the tractor treads 58 propels the tractor 10 in an upstream or forward direction 66 (see FIG. 1) that is generally opposite the downstream direction 16.

The propulsion motor 36 is also operable in a reverse gear setting in which the motor 36 rotates the drive shaft 50 and tractor treads 58 in the reverse direction 54. Reverse rotation of the tractor treads 58 propels the tractor 10 in a reverse direction that is generally the same as the downstream direction 16. In this regard, the tractor 10 is a self-propelled tractor capable of forward and reverse movement under power. Because the tractor 10 is self-propelled, the tractor motor 36 can be used to easily and quickly change the direction of the tractor's movement between the forward direction 66 and the reverse direction 16.

When the propulsion motor is turned off and left in the forward gear or the reverse gear setting, the motor will resist reverse or forward rotation respectively. A free-wheeling clutch 68 is also provided that allows the tractor treads 58 to freely rotate in the forward and reverse direction 52, 54 when the tractor motor 36 is in a neutral setting.

Figure 4:
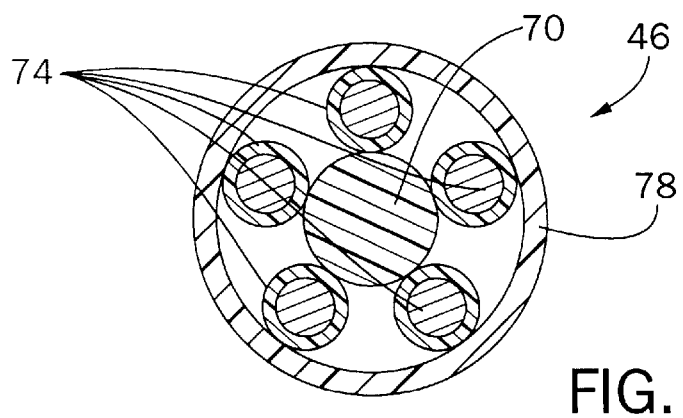
FIG. 4 is a cross sectional view of the push rod cable taken generally along line 4—4 in FIG. 1.

Referring to FIG. 4, the push rod cable 46 includes a core material 70 having a longitudinal compressive strength sufficient to push the lateral camera 44 into the lateral sewer pipe 14, and a transverse flexibility sufficient to negotiate bends encountered within the lateral sewer pipe 14. The push rod cable 46 extends out the rear end 30 of the tractor 10 and down the main sewer line 12. The push rod cable is then joined with a highly-flexible cable 71 (see FIG. 1) containing the transmission wiring for the lateral camera 44, but having no core 70. The highly-flexible cable 71 loops back to the tractor 10. Although virtually any length of cables 46, 71 can be used, the preferred length is about a 75 foot push rod cable and about a 75 foot highly flexible cable 71. The use of more push rod cable 46 than about 75 feet is made difficult due to frictional interaction between the push rod cable 46 and the lateral sewer pipe walls.

As seen in FIG. 1, a tag line 72 is interconnected with the end of the push rod cable 46 and is used to monitor the distance to which the push rod cable 46 has been inserted into the lateral sewer pipe 14. The tag line 72 may also be used to pull the push rod cable 46 and lateral camera 44 from the lateral sewer pipe 14, and to pull the tractor 10 out of the manhole 20 if necessary.

As seen in FIG. 1, the push rod cable 46 may be required to negotiate severe bends 73 in the lateral sewer pipe 14. In some cases, it may be necessary to insert the tractor 10 into a main pipe 12 upstream of the lateral pipe 14 to be inspected. Because most lateral pipes 14 are angled about 45° with respect to the main pipe 12, the push rod cable 46 would have to bend around that initial angle to be inserted into the lateral sewer pipe 14. The preferred push rod cable 46 is capable of negotiating substantially all such angles and bends.

Referring again to FIG. 4, the push rod cable 46 also includes all necessary electrical transmission and video and lights wiring (collectively referred to as "lateral camera wiring") 74. The lateral camera wiring 74 includes all electrical and video wiring necessary to remotely operate the lateral camera 44. The lateral camera wiring 74 also includes electrical power lines that supply power to an array of lateral camera lights 76 (see FIGS. 10, 12, and 13) and to the lateral camera 44. The lateral camera wiring 74 is disposed along an outer surface of the core 70. Encasing the lateral camera wiring 74 and the core 70 is a resilient shell 78. In the preferred embodiment, the resilient shell 78 is made of nylon, the overall diameter of the push rod cable 46 is about 0.5 inch, and the core 70 is a fiberglass rod of about 0.187 inch diameter.

As illustrated in FIGS. 1 and 5–13, the launch chute assembly 38 aligns the lateral camera 44 with a lateral sewer pipe opening 80, and the drive assembly 40 inserts and removes the push rod cable 46 and lateral camera 44 with respect to the lateral sewer pipe 14. The launch assembly includes three launch motors: a drive motor 82; a rotate motor 84; and a tilt motor 86.

FIGS. 5–9 illustrate the preferred drive assembly 40 which includes the drive motor 82 interconnected with the frame 24. In the preferred embodiment, the drive motor 82 is a 10 Watt electric motor available from Micro Mo Electronics, Inc. of Clearwater, Fla., part number 3540K. The drive motor 82 is interconnected with a transmission 88 that provides a power take-off shaft 90. A miter gear 92 is interconnected with the power take-off shaft 90 for rotation therewith.

Figure 5:
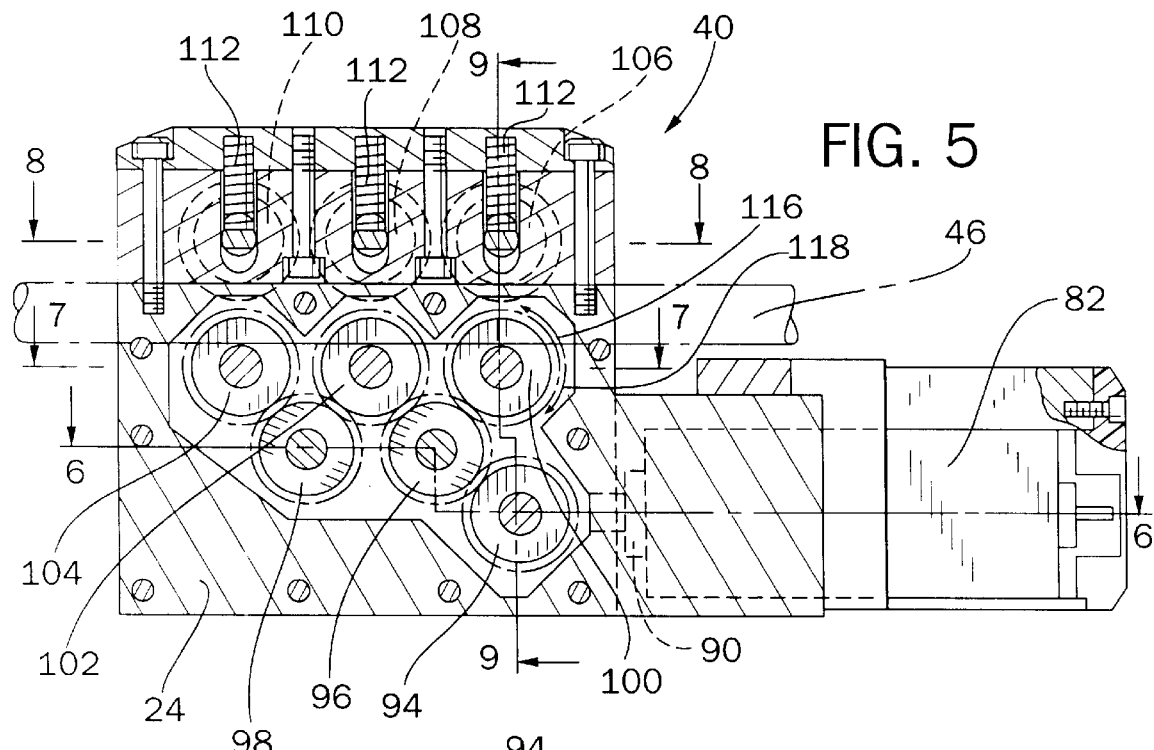
FIG. 5 is a cross sectional view of a portion of the apparatus taken generally along line 5—5 in FIG. 2.
Figure 6:
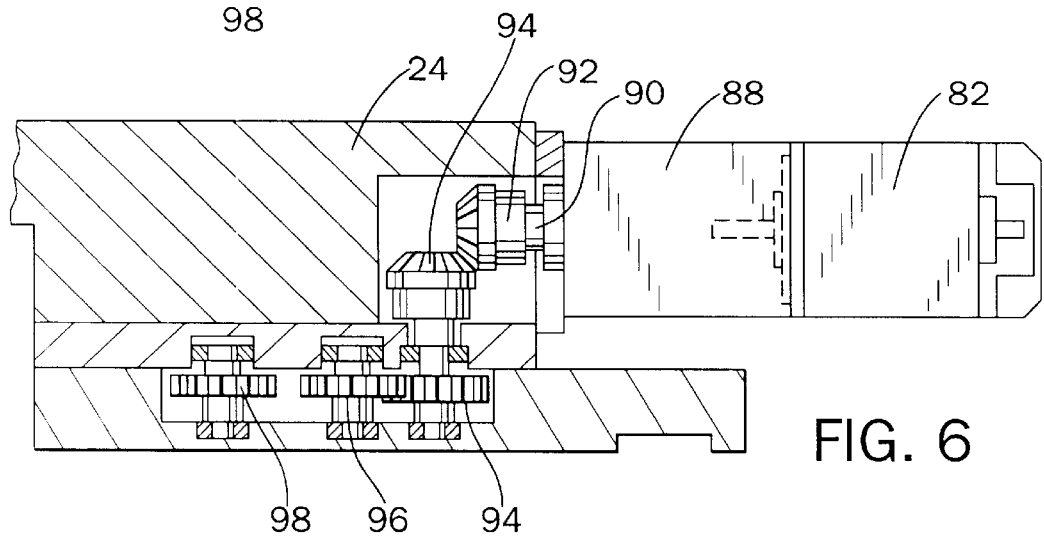
FIG. 6 is a cross sectional view of a portion of the apparatus taken generally along line 6—6 in FIG. 5.
Figure 7:
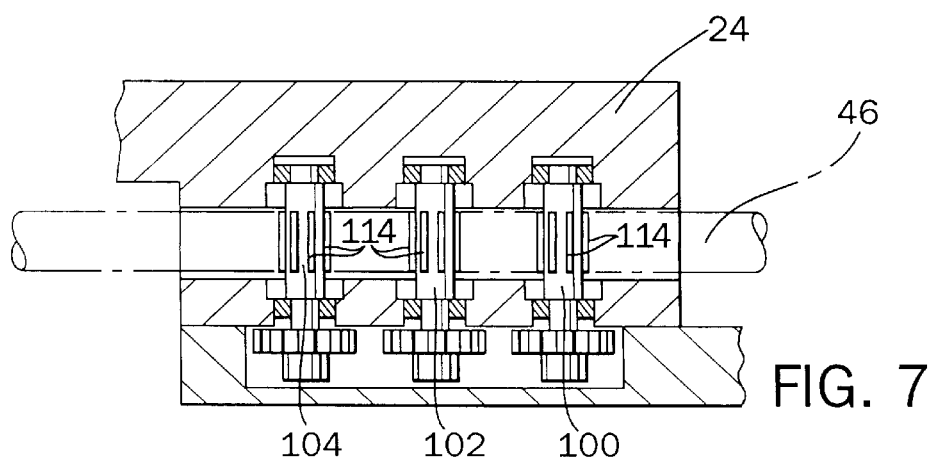
FIG. 7 is a cross sectional view of a portion of the apparatus taken generally along line 7—7 in FIG. 5.

Referring now to FIGS. 5–7, the miter gear 92 drives a gear train including a power transfer gear 94; first and second pinion gears 96, 98; and first, second, and third drive gears 100, 102, 104. The miter gear 92 meshes with the power transfer gear 94, which in turn meshes with the first pinion gear 96. The first pinion gear 96 meshes with the first and second drive gears 100, 102. The second drive gear 102 meshes with the second pinion gear 98, which meshes with the third drive gear 104. Each of the gears in the gear train is mounted for rotation with respect to the frame 24. Other gear train configurations involving fewer or more drive gears may be used without departing from the spirit and scope of the invention. Additionally, rotation of the various gears may be transferred to the other gears by way of belts and chains, or other suitable rotational transfer means, instead of direct meshing. Also, the gears in the gear train may be friction rollers or any other suitable rotational members that transfer rotation of the power take off shaft 90 to the drive gears 100, 102, 104.

Figure 8:
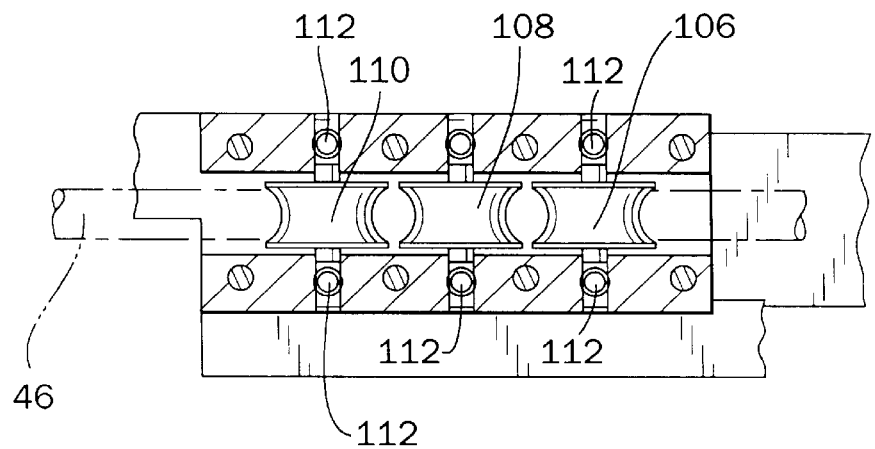
FIG. 8 is a cross sectional view of a portion of the apparatus taken generally along line 8—8 in FIG. 5.

As seen in FIGS. 5, 8, and 9, the drive assembly 40 further includes first, second, and third pressure rollers 106, 108, 110 positioned generally opposite the first, second, and third drive gears 100, 102, 104, respectively. The push rod cable 46 is positioned between the drive gears 100, 102, 104 and the pressure rollers 106, 108, 110. The pressure rollers 106, 108, 110 include springs 112 spring loaded to about 80–100 psi in the preferred embodiment to ensure that the push rod cable 46 is pressed firmly against the drive gears 100, 102, 104 by the pressure rollers 106, 108, 110.

Referring to FIGS. 7 and 9, the drive gears 100, 102, 104 preferably have drive gear teeth 114 that impinge on the resilient shell 78 of the push rod cable 46, but that do not fully penetrate or damage the resilient shell 78, the wires of the lateral camera wiring 74, or the core 70. The resilient shell 78 is soft enough to allow the drive gear teeth 100, 102, 104 to impinge on an outer surface of the shell 78, but tough enough to resist full penetration of the shell 78 by the drive gear teeth 100, 102, 104.

Although the preferred embodiment includes drive gears 100, 102, 104, other embodiments may use suitable friction pressure rollers in place of the drive gears. Such pressure rollers would act on the push rod cable by way of surface friction instead of impinging on the surface of the shell 78.

Referring now to FIG. 5, the drive motor 82 is capable rotating the drive gears 100, 102, 104 through the drive train 40 in both an insertion direction 116 and a retraction direction 118. Rotation of the drive gears in the insertion direction 116 causes the drive gears to push the push rod cable 46 and lateral camera 44 into the lateral sewer pipe 14. Rotation of the drive gears in the retraction direction 118 causes the drive gears to pull the push rod cable 46 and the lateral camera 44 out of the lateral sewer pipe 14.

As best seen in FIGS. 10, 12, and 13, the rotate motor 84 is interconnected with the front portion 26 of the frame 24. The rotate motor 84 includes a power take off shaft 120 that rotates a rotate gear 122. The rotate gear 122 meshes with a collar gear 124. The collar gear 124 is interconnected for rotation with a slip ring 126 and a rotate sleeve 128 that are supported by bearings 130 for rotation within in a housing 132. The push rod cable 46 passes through the collar gear 124, the slip ring 126, and the rotate sleeve 128. The collar gear 124, the slip ring 126, and the rotate sleeve 128 therefore rotate about the push rod cable 46 and the longitudinal axis 34 or an axis generally parallel to the longitudinal axis 34. A suitable rotate motor 84 is available from Micro Mo Electronics, Inc. of Clearwater, Fla., part number 2233U. With reference to FIG. 13, the rotate motor 84 is capable of rotating the launch chute assembly 38 in both a clockwise 134 and a counterclockwise 136 direction.

Referring to FIG. 12, the launch chute assembly 68 includes a first bracket 138 interconnected for rotation with the rotate collar 128 with suitable joining means 140 (see FIG. 10), such as a fastener, a pin, or a clip. The main camera 42 is interconnected with the first bracket 138 with mounting means 142, which may be, for example, fasteners, pins, or clips. The main camera 42 is positioned at an angle 143 with respect to horizontal. Preferably, the angle 143 is set to 12°–15°, although it may be adjusted depending on the diameter of the main sewer pipe. The main camera rotates with the first bracket 138 and rotate sleeve 128 about the longitudinal axis 34. A jump cable 144 interconnects the main camera 42 with a main camera power supply and video line 146.

FIGS. 12 and 13 illustrate a second bracket 148 of the launch chute assembly 38 pivotally interconnected with the first bracket 138 about a first transverse axis of rotation 150 (see FIGS. 2 and 13). A pair of attachment means 152, such as fasteners, pins, or the like interconnect the first and second brackets 138, 148, and allow pivotal movement of the second bracket 138 with respect to the first bracket 148. The first transverse axis of rotation 150 is substantially normal to the tractor longitudinal axis 34. The second bracket 148 rotates with the first bracket 138 about the longitudinal axis 34. The first transverse axis 150 therefore rotates about the longitudinal axis 34 with the first and second brackets 133, 148, while remaining substantially normal to longitudinal axis 34.

As seen in FIGS. 2, 10, 12, and 13, the second bracket 148 includes a pair of opposite side walls 154 and a bottom wall 156. The side walls 154 and the bottom wall 156 together define a channel 158 in which the lateral camera 44 is supported when in a fully retracted position. The lateral camera 44 is deployed from the channel 158 when the drive gears 100, 102, 104 are rotated in the insertion direction 116. The second bracket 148 also includes angled flanges 160 interconnected with a front edge of each of the side walls 154 and the bottom wall 156. The angled flanges 160 direct the lateral camera 44 into the channel 158 when the lateral camera 44 is retracted into the fully retracted position.

The launch chute assembly 38 also includes a third bracket or pinion arm 168 that is connected at a first end to the second bracket 148, and that is pivotal about a second transverse axis of rotation 170 (see FIG. 2) defined by a pair of attachment means 172, such as fasteners, pins, or the like. The second transverse axis of rotation 170 is substantially parallel to the first transverse axis of rotation 150 and is substantially normal to the longitudinal axis 34.

The second and third brackets 148, 168 are pivotal with respect to each other about the second transverse axis of rotation 170. The third bracket 168 and the second transverse axis of rotation 170 rotate with the first and second brackets 138, 148 and the first transverse axis of rotation 150 about the longitudinal axis 34, with the second axis of rotation 170 remaining substantially normal to the longitudinal axis 34 and substantially parallel to the first axis of rotation 150.

As best shown in FIG. 13, a second end of the third bracket 168 opposite the first end thereof is interconnected with a pinion bar 176. The pinion bar 176 has extending therethrough a threaded bore 178. A drive screw 180 having a longitudinal axis 182 is threaded into the threaded bore 178 of the pinion bar 176, and extends beyond the pinion bar 176 in front of the tractor 10.

With reference to FIGS. 12 and 13, the tilt motor 86 is mounted on a lower portion of the launch chute assembly 38. In the preferred embodiment, the tilt motor 86 is an electric motor available from Micro Mo Electronics, Inc. of Clearwater, Fla., part number 3540. The tilt motor 86 drives the drive screw 180, rotating the drive screw 180 about its longitudinal axis 182. The tilt motor 86 is capable of rotating the drive screw 180 in a raise direction 184 (see FIG. 13) and a lower direction 186 that is opposite the raise direction 184.

When the tilt motor 86 drives the drive screw 180 in the raise direction 184, the pinion bar 176 moves along the threaded drive screw 180 toward the tilt motor 86, causing the third bracket 168 to push against the second bracket 148. This causes the second bracket 148 to rotate about the first transverse axis of rotation 150, thereby tilting the second bracket 148 and raising the lateral camera 44 with respect to the tractor longitudinal axis 34. When the tilt motor 86 drives the drive screw 180 in the lower direction 186, the pinion bar 176 moves along the drive screw 180 away from the tilt motor 86, causing the second bracket 148 to lower the lateral camera 44.

Figure 17:
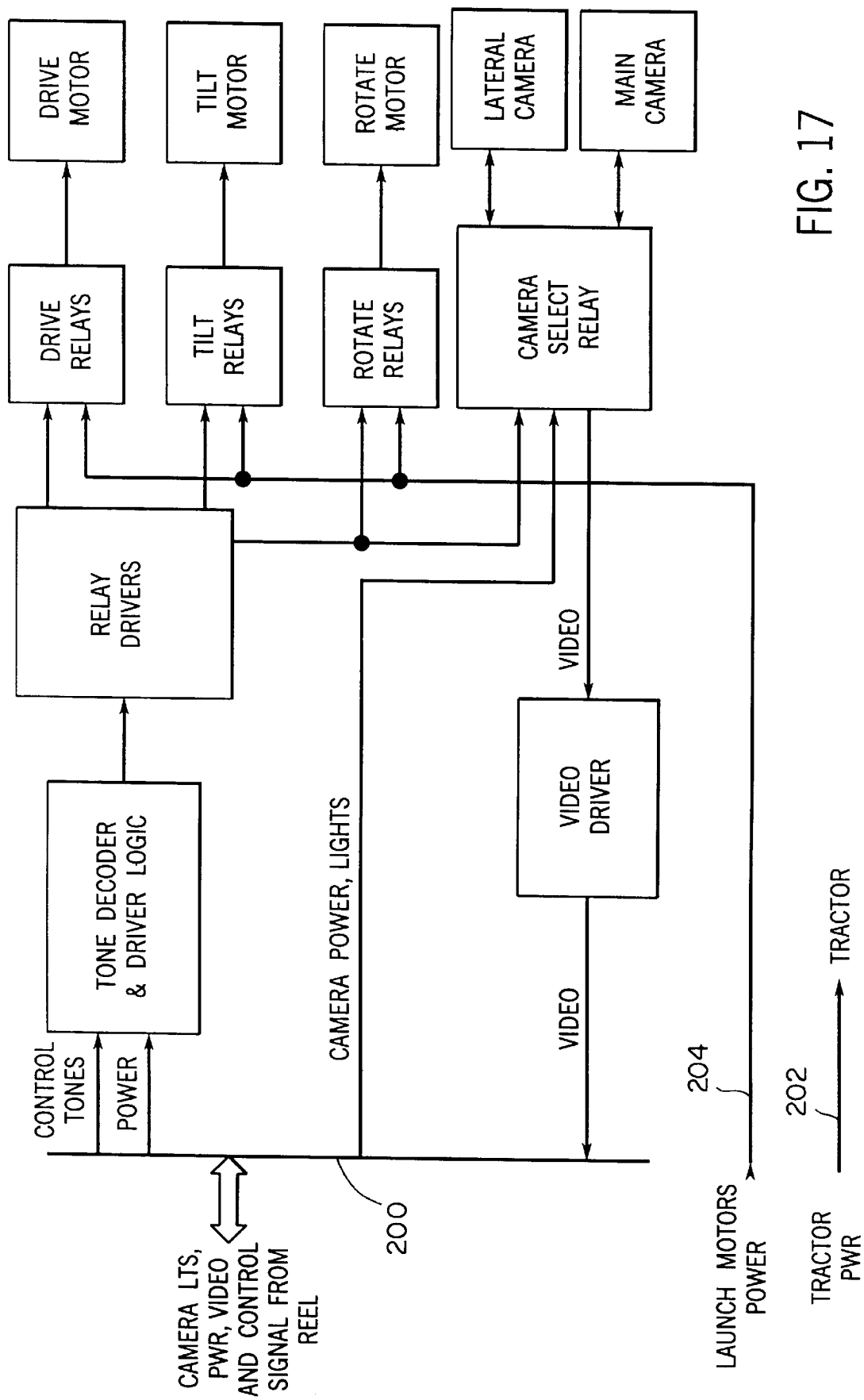
FIG. 17 is a schematic drawing of the electrical and video wiring of the apparatus.

FIGS. 15, 16, and 17 illustrate the electrical and video wiring of the tractor 10 in varying degrees of detail. The supply cable breaks into a first, second, and third cable 200, 202, 204 a short distance behind the tractor 10. The first, second, and third cables 200, 202, 204 conveniently plug into respective first, second, and third tractor cables 206, 208, 210. A pair of pull chains or cables 212 (see FIG. 2) are interconnected with both the frame 24 and the supply cable 22 to allow the tractor 10 to drag the supply cable 22 behind it without disconnecting the plug connections.

The first cable 200 includes a camera power line, a lights power line, a video line, and a control line. The first tractor cable 200 is interconnected with a tone relay 214 that is mounted on the frame 24 of the tractor 10. The tone relay 214 includes a tone decoder, a bank of relay drivers, and a camera select relay. The tone relay reacts to tones sent down the control line in a similar fashion to automated touch tone phone services.

The camera power line, the lights power line, and the video line are wired into the camera select relay. When a signal is sent down the control line from the remote control station, the tone relay 214 decodes the signal, and sends the signal to the relay drivers. The relay drivers instruct the camera select relay to feed camera power and lights power to one of the main camera 42 and the lateral camera 44. The relay drivers also instruct the camera select relay to receive video signals from one of the main camera 42 and the lateral camera 42.

The second cable 202 arid second tractor cable 208 deliver power to the tractor motor 36, allowing the tractor motor 36 to drive the tractor treads in the forward or reverse direction as described above.

The third cable 204 includes a launch motor power supply for the launch motors. The launch motor power supply is interconnected with the tone relay 214 through the third tractor cable 210. The tone relay 214 further includes a drive relay, a tilt relay, and a rotate relay. Electrical conduit 220 connects the drive relay to the drive motor 82, the tilt relay to the tilt motor 86, and the rotate relay to the rotate motor 84.

Based on the signal sent through the control line of the first cable 200, the tone relay 214 instructs the relay drivers to energize one of the drive relay, tilt relay, and rotate relay. This operates the drive motor 82, tilt motor 86, or rotate motor 84, respectively, under power in a selected direction.

In this regard, only one of the main and the lateral camera 42, 44 can be operated at one time, and only one of the launch motors can be operated at one time in the preferred embodiment. However, it is within the scope of the invention to provide sufficient camera power, camera lights power, and video wiring lines through the supply cable to operate all motors and cameras simultaneously. The tractor motor operates independently of the launch motors in the preferred embodiment.

Referring to FIGS. 10, 11, 14 and 15, the tilt motor 86 is electrically wired to the above-described slip ring 126. The slip ring 126 includes a pair of circumferential grooves 222 and a pair of rings 224 of brass or other electrical conductor press fit into the grooves 222. Electrical insulating material 226, such as rubber, lines the grooves and prevents electricity from being conducted through the slip ring 126. Insulated collars 228 extend through the slip ring 126, allowing wires 230 to electrically interconnect the tilt motor 86 and the rings 224. A pair of spring pins or pogo pins 232 extend through a portion of the housing 132 and contact the rings 224. The pogo pins 232 are electrically interconnected with the tilt drive relay through the conduit 220. Thus, electricity is supplied to the tilt motor 86 without twisting the electrical conductors.

Referring to FIG. 15, a lateral extension cable 236 is also interconnected with the tone relay 214. The lateral extension cable 236 includes all the wiring necessary for the lateral camera 44, including camera power, lights power, and video transmission wiring. The lateral extension cable 236 includes a plug at a distal end thereof for interconnecting the lateral extension cable 236 with a length of the highly flexible cable 71 and push rod cable 46. From the plug, the highly flexible cable 71 extends down the main sewer pipe 12 in the downstream direction 16 and is dragged behind the tractor 10. The push rod cable 46 then loops back to the tractor 10, is fed through the launch assembly, and interconnected with the lateral inspection camera 44.

In the preferred embodiment, the tractor 10 operates in the following manner. An operator at the remote control station 18 views the inside of the main pipe 12, the lateral camera 44, and the upcoming lateral sewer pipe opening 80 through the main camera 42. The tractor 10, with the lateral camera 44 in the fully retracted position, is propelled by the tractor motor 36 and tractor treads 58 in the forward or reverse direction 66, 16 until the lateral camera 44 is positioned near the opening 80 the lateral pipe. Then the tractor motor 10 is disengaged, and the tractor motor left in forward gear to lock the tractor 10 against movement in the downstream direction 16.

The rotate motor 84 is then engaged to rotate the launch chute assembly 38 about longitudinal axis 34 until the lateral camera 44 is generally adjacent the opening 80 as seen through the main camera 42. If further adjustment is necessary, the tilt motor 86 is engaged, causing the drive screw 180 to rotate and the pinion arm 176 to move along drive screw 180. In this manner, the lateral camera 44 is raised and lowered with respect to the tractor longitudinal axis 34.

Then the drive motor 82 is engaged, rotating the drive gears 100, 102, 104 in the insertion direction 116 to push the lateral camera 44 into the lateral sewer pipe 14. Once the operator at the remote control station 18 has confirmed that the lateral camera 44 has been properly inserted in to the lateral sewer pipe 14, the operator sends a signal down the control line to switch the video signal from that of the main camera 42 to that of the lateral video camera 44.

The drive motor 82 continues to rotate the drive gears 100, 102, 104 in the insertion direction 116 and the lateral sewer pipe 14 is examined for cracks. If the lateral camera 44 encounters an obstruction, such as a root, a clog of waste material, or a misaligned joint, that the drive motor 82 is unable to overcome, the drive motor 82 is disengaged, thereby locking the drive motor 82 and drive gears 100, 102, 104 from rotating in the insertion and retraction directions 116, 118.

Then the tractor motor 36 is engaged and used to propel the tractor 10 in the reverse direction 16 a small amount, on the order of one or two feet, and then in the forward direction 66 in rapid succession. In this manner, the tractor 10 is used to ram the push rod cable 46 and lateral camera 44 into the lateral sewer pipe 14 and against the obstruction. The tractor motor 36 is more powerful than the drive motor 82, and is therefore better able to overcome obstacles in the lateral sewer pipe 14. The tractor motor 36 may be rapidly switched between the reverse gear and forward gear settings several times to facilitate ramming the lateral camera 44 through or past the obstruction.

The lateral camera 44 is further assisted and caused to roll or twist by rotating and tilting the launch chute assembly 38. Therefore, the rotate and tilt motors 84, 86 are also used to overcome obstacles encountered within the lateral sewer pipe 14.

Although particular embodiments of the present invention have been shown and described, other alternative embodiments will be apparent to those skilled in the art and are within the intended scope of the present invention. Thus, the present invention is to be limited only by the following claims.

I claim:

1. An apparatus for inspecting a lateral conduit from a main conduit, the apparatus comprising:
    a frame;
    a drive motor interconnected with the frame;
    at least one drive gear selectively rotated by the drive motor in one of an insertion direction and a retraction direction;
    a push rod cable engaged by the at least one drive gear such that rotation of the at least one drive gear in the insertion and retraction directions causes respective insertion and retraction of the push rod cable with respect to the lateral conduit, the push rod cable including
        a core having sufficient longitudinal compressive rigidity to allow insertion of the push rod cable into the lateral conduit and having sufficient transverse flexibility to negotiate substantially all bends within the lateral conduit,
        a push rod circuitry disposed along an outside surface of the core; and
        a lateral camera interconnected with the push rod cable for insertion into the lateral conduit with the push rod cable, wherein the push rod circuitry contains the necessary electrical and video circuitry to operate the lateral camera;
    a movable friction member interconnected with the frame for movement with respect to the frame, and adapted to frictionally engage an inner surface of a wall of the main conduit; and
    a propulsion motor interconnected with the frame, and operatively interconnected with the movable friction member for selective movement of the friction member to cause movement of the apparatus in one of a forward and reverse direction with respect to the main conduit.

2. The apparatus of claim 1, wherein the push rod cable includes a shell substantially encasing the push rod circuitry and the core.

3. The apparatus of claim 2, wherein the drive gear frictionally engages an outer surface of the shell.

4. The apparatus of claim 2, wherein the drive gear includes a plurality of drive gear teeth that at least partially impinge on an outer surface of the shell to facilitate insertion and retraction of the push rod cable with respect to the lateral conduit.

5. The apparatus of claim 2, further comprising at least one pressure roller, wherein the at least one pressure roller applies pressure to a portion of the push rod cable to facilitate engagement of an outer surface of the shell by the at least one drive gear.

6. The apparatus of claim 5, wherein the at least one pressure roller includes at least one spring that biases the at least one pressure roller against the push rod cable.

7. The apparatus of claim 6, wherein the at least one spring enables the at least one pressure roller to apply about 80–100 psi pressure to the portion of the push rod cable.

8. The apparatus of claim 5, wherein the at least one drive gear includes three drive gears, and wherein the at least one pressure roller includes three pressure rollers.

9. The apparatus of claim 1, further comprising a remote control station and a supply cable interconnecting the remote control station with the apparatus, the supply cable including all electrical and video circuitry necessary to operate the apparatus from the control station and to allow inspection of the lateral conduit through the lateral camera.

10. The apparatus of claim 1, wherein the propulsion motor is more powerful than the drive motor, and wherein the drive motor is adapted to be selectively locked, thereby preventing rotation of the at least one drive gear in either the insertion direction or retraction direction to permit the propulsion motor to be engaged to move the apparatus in the forward direction and in the reverse direction in rapid succession to overcome an obstruction encountered within the lateral conduit.

11. The apparatus of claim 1, further comprising:
    a launch chute assembly interconnected with a front portion of the frame, the launch chute assembly at least partially supporting the lateral camera when the lateral camera is in a fully retracted position; and
    a rotate motor interconnected with the frame and with the launch chute assembly, and adapted to selectively rotate the launch chute assembly in one of a clockwise and a counterclockwise direction about a rotate axis that is generally parallel to the longitudinal axis.

12. The apparatus of claim 11, further comprising a main camera interconnected with the launch chute assembly for rotation therewith about the rotate axis.

13. The apparatus of claim 12, further comprising a remote control station and a supply cable interconnecting the remote control station with the apparatus, the supply cable including all electrical and video circuitry necessary to operate the apparatus from the control station, the relative positions of the lateral camera and an opening to the lateral conduit being viewable through the main camera from the remote control station, wherein the lateral conduit may be inspected through the lateral camera from the remote control station.

14. The apparatus of claim 11, wherein the launch chute assembly includes a launch chute member, and wherein the lateral camera is at least partially supported by the launch chute when the lateral camera is in the fully retracted position.

15. The apparatus of claim 14, wherein the launch chute member defines a channel in which the lateral camera is at least partially housed when the lateral camera is in the fully retracted position.

16. An apparatus for inspecting a lateral conduit from a main conduit, the apparatus comprising:
    a frame;
    a drive motor interconnected with the frame;
    at least one drive gear selectively rotated by the drive motor in one of an insertion direction and a retraction direction;

a push rod cable engaged by the at least one drive gear such that rotation of the at least one drive gear in the insertion and retraction directions causes respective insertion and retraction of the push rod cable with respect to the lateral conduit, the push rod cable including
  a core having sufficient longitudinal compressive rigidity to allow insertion of the push rod cable into the lateral conduit and having sufficient transverse flexibility to negotiate substantially all bends within the lateral conduit, and
  a push rod circuitry disposed along an outside surface of the core;
a lateral camera interconnected with the push rod cable for insertion into the lateral conduit with the push rod cable, wherein the push rod circuitry contains the necessary electrical and video circuitry to operate the lateral camera;
a launch chute assembly interconnected with a front portion of the frame, the launch chute assembly at least partially supporting the lateral camera when the lateral camera is in a fully retracted position;
a rotate motor interconnected with the frame and with the launch chute assembly and adapted to selectively rotate the launch chute assembly in one of a clockwise and a counterclockwise direction about a rotate axis that is generally parallel to the longitudinal axis;
the launch chute assembly including a launch chute member;
said lateral camera being at least partially supported by the launch chute member when the lateral camera is in the fully retracted position; and
a tilt motor operably interconnected with the launch chute assembly to selectively raise and lower the launch chute member and the lateral camera with respect to the rotate axis.

17. An apparatus for inspecting a lateral conduit from a main conduit, the apparatus comprising:
  a frame;
  a drive motor interconnected with the frame;
  at least one drive gear selectively rotated by the drive motor in one of an insertion direction and a retraction direction;
  a push rod cable engaged by the at least one drive gear such that rotation of the at least one drive gear in the insertion and retraction directions causes respective insertion and retraction of the push rod cable with respect to the lateral conduit the push rod cable including
    a core having sufficient longitudinal compressive rigidity to allow insertion of the push rod cable into the lateral conduit and having sufficient transverse flexibility to negotiate substantially all bends within the lateral conduit, and
    a push rod circuitry disposed along an outside surface of the core;
  a lateral camera interconnected with the push rod cable for insertion into the lateral conduit with the push rod cable, wherein the push rod circuitry contains the necessary electrical and video circuitry to operate the lateral camera;
  a launch chute assembly interconnected with a front portion of the frame, the launch chute assembly at least partially supporting the lateral camera when the lateral camera is in a fully retracted position;
a rotate motor interconnected with the frame and with the launch chute assembly, and adapted to selectively rotate the launch chute assembly in one of a clockwise and a counterclockwise direction about a rotate axis that is generally parallel to the longitudinal axis; and
said launch chute assembly including
  a first bracket interconnected with the frame and rotatable by the rotate motor about the rotate axis;
  a second bracket interconnected with the first bracket for rotation therewith about the rotate axis and pivotable with respect to the first bracket about a first transverse axis that is substantially normal to the rotate axis, the second bracket defining a channel in which the lateral camera is at least partially housed when in the fully retracted position;
  a third bracket interconnected with the second bracket for rotation therewith about the rotate axis, the second and third brackets pivotal with respect to each other about a second transverse axis that is substantially normal to the rotate axis; and
  a tilt motor interconnected with the third bracket to selectively move the third bracket toward or away from the tilt motor, thereby causing the second bracket to raise or lower the lateral camera with respect to the rotate axis.

* * * * *